United States Patent
Hashimoto et al.

(10) Patent No.: US 7,782,098 B2
(45) Date of Patent: Aug. 24, 2010

(54) DRIVE CIRCUIT AND INVERTER FOR VOLTAGE DRIVING TYPE SEMICONDUCTOR DEVICE

(75) Inventors: Takayuki Hashimoto, Tokai (JP); Takashi Hirao, Hitachi (JP); Masaki Shiraishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/170,472

(22) Filed: Jul. 10, 2008

(65) Prior Publication Data

US 2009/0033377 A1 Feb. 5, 2009

(30) Foreign Application Priority Data

Jul. 12, 2007 (JP) .............................. 2007-182738

(51) Int. Cl.
*H03K 3/00* (2006.01)
(52) U.S. Cl. .................. 327/108; 327/109; 327/111
(58) Field of Classification Search ................ 327/108, 327/109, 110, 111, 112
See application file for complete search history.

(56) References Cited

U.S. PATENT DOCUMENTS

| | | | |
|---|---|---|---|
| 4,103,183 A | 7/1978 | Rosenthal et al. | |
| 4,176,289 A * | 11/1979 | Leach et al. | 326/88 |
| 6,356,137 B1 | 3/2002 | Roohparvar et al. | |
| 6,504,396 B2 * | 1/2003 | Sher et al. | 326/21 |
| 6,836,173 B1 * | 12/2004 | Yang | 327/390 |
| 6,850,089 B2 * | 2/2005 | Huang et al. | 326/26 |

FOREIGN PATENT DOCUMENTS

| | | |
|---|---|---|
| JP | 8-14976 | 1/1996 |
| JP | 2000-59189 | 2/2000 |

OTHER PUBLICATIONS

Search Report issued in European Patent Application No. 08012240.1 on Jan. 20, 2010.

* cited by examiner

*Primary Examiner*—Kenneth B. Wells
(74) *Attorney, Agent, or Firm*—Antonelli, Terry, Stout & Kraus, LLP.

(57) ABSTRACT

A drive circuit for driving a semiconductor element is equipped with: a first switch connected to a positive side of a DC power supply; a second switch connected to the other terminal of the first switch and to a negative side of the DC power supply; a third switch connected to the positive side of the DC power supply; a fourth switch connected to the other terminal of the third switch; a fifth switch connected to the other terminal of the fourth switch and to the negative side of the DC power supply; and a capacitor connected to the other terminal of the first switch and to the other terminal of the fourth switch. A gate of the semiconductor element is connected to the other terminal of said third switch; and a source of the semiconductor element is connected to the negative side of the DC power supply.

8 Claims, 9 Drawing Sheets

DIAGRAM FOR REPRESENTING CURRENT PATH OF MODE 1

DIAGRAM FOR REPRESENTING CURRENT PATH OF MODE 2

US 7,782,098 B2

DRIVE CIRCUIT AND INVERTER FOR VOLTAGE DRIVING TYPE SEMICONDUCTOR DEVICE

BACKGROUND OF THE INVENTION

The present invention is related to a drive circuit of a voltage driving type semiconductor element which is employed in a power converter, and also related to an inverter apparatus.

Voltage driving type semiconductor elements such as power MOSFETs (Metal Oxide Semiconductor Field-Effect Transistors) and IGBTs (Insulated-Gate Bipolar Transistors) have a large number of such merits that drive circuits thereof can be made compact and can be operated with low losses, as compared with current driving type semiconductor elements such as thyristors. FIG. 10 is a structural diagram of a single-phase inverter with employment of power MOSFETs as the above-described voltage driving type semiconductor elements.

In the structural diagram of FIG. 10, the single-phase inverter has been equipped with power MOSFETs "M1" to "M4", diodes "D1" to "D4" which have been built in these power MOSFETs "M1" to "M4", a power supply voltage "Vin", and an inductor 14 which constitutes a load. Drive circuits "G1" to "G4" have been connected to the above-described power MOSFETs "M1" to "M4", respectively, the detailed circuit arrangement of which is shown in FIG. 11.

In FIG. 11, a drive circuit 1 is arranged by a DC power supply "Vdd", a logic circuit, p-type channel MOSFETs "PM1" to "PM3", and n-type channel MOSFETs "MN1" to "NM3." Since a gate capacitance of the power MOSFET "M1" is large, a PWM signal is amplified by the CMOSFETs "PM1" to "PM3" and "NM1" to "NM3", which constitute a buffer, and then, the amplified PWM signal drives the gate of the power MOSFET "M1." The logic circuit contains a function capable of shutting down the drive circuit 1 when the voltage of the DC power supply "Vdd" is lowered; a function capable of preventing shortcircuits of upper and lower arms; a function capable of protecting the power MOSFET "M1" from an overvoltage and an overcurrent; and the like.

In the case that the power MOSFET "M1" is turned ON, the P-type channel MOSFET "PM3" employed in a final output stage of the drive circuit 1 is turned ON, and the n-type channel MOSFET "NM3" of this final output stage is turned OFF, so that a voltage at the gate of the power MOSFET "M1" is increased to the voltage of the power supply "Vdd." On the other hand, in the case that the power MOSFET "M1" is turned OFF, the p-type channel MOSFET "PM3" employed in the final output stage of the drive circuit 1 is turned OFF, and the n-type channel MOSFET "NM3" of this final output stage is turned ON, so that a voltage at the gate of the power MOSFET "M1" is lowered to a potential at the source thereof.

However, in an actual circuit, as represented in FIG. 12, stray resistances "Rs1" to "Rs3", and stray inductances "Ls1" to "Ls3" are present, which are caused by package and wiring lines of a circuit board. As a result, while switching operation of the power MOSFET "M1" is carried out, the gate voltage of the power MOSFET "M1" is shifted from the DC voltage of the power supply "Vdd" when the power MOSFET "M1" is turned ON, or shifted from the source voltage when the power MOSFET "M1" is turned OFF.

If the drain voltage is increased under such a condition that the power MOSFET "M1" is turned OFF, then a capacitance "Cgs" between the gate and the source of the power MOSFET "M1" is charged via another capacitance "Cgd" between the gate and the drain thereof, so that the gate voltage is increased. When the increased gate voltage exceeds a threshold voltage, the power MOSFET "M1" is erroneously ignited, namely turned ON. If the stray resistances "Rs1" to "Rs3" and the stray inductances "Ls1" to "Ls3" are sufficiently small, then a variation of the gate voltages is small, so that the erroneous ignition of the power MOSFET "M1" may be suppressed. Also, even when the drain voltage of the power MOSFET "M1" is gently increased, a variation of the gate voltages is small, so that the erroneous ignition of the power MOSFET "M1" may be suppressed.

Next, a description is made of a mechanism why erroneous ignition occurs while an inverter is driven with reference to FIG. 13 and FIG. 14. In FIG. 13, while the power MOSFETs "M1", "M2", "M3" have been turned OFF and the power MOSFET "M4" has been turned ON, a current is circulated through a path formed by the diode "D2", the inductor 14, and the power MOSFET "M4" (namely, status of mode 1). In FIG. 14, the power MOSFET "M1" is turned ON; a current flows through the power MOSFET "M1", the inductor 14, and the power MOSFET "M4" (namely, status of mode 2); and the voltage of the DC power supply "Vin" is applied to the inductor 14. If the power MOSFET "M1" is turned ON, then the voltage at the drain of the MOSFET "M2" is increased up to the voltage of the power supply "Vin." However, since a stray inductance of a circuit is present, the voltage at the drain of the power MOSFET M2 becomes higher than or equal to the voltage of the power supply "Vin" in a transition manner. In this case, the gate voltage of the power MOSFET "M2" is increased via the capacitance "Cgd" between the gate and the drain of the power MOSFET "M2", and if this increased gate voltage exceeds a threshold value, then the power MOSFET "M2" is erroneously ignited, so that a feed-through current flows through the power MOSFETs "M1" and "M2."

FIG. 15 represents voltages "Vgs" between the gates and the sources of the power MOSFETs "M1" and "M2"; voltages "Vds" between the drains and the sources thereof; and drain currents "Id" thereof. In this case, the current of the built-in diode "D2" has been contained in the drain current "Id" of the power MOSFET "M2." When the mode 1 (see FIG. 13) is selected, the gate voltages "Vgs" of the power MOSFETs "M1" and "M2" are zero, and the current is flowing through the diode "D2." When the power MOSFET "M1" is turned ON (mode 2), the current flowing through the diode "D2" is lowered and the drain voltage "Vds" of the power MOSFET "M2" is increased. However, in this case, an increase "15" of the gate voltage "Vds" of the power MOSFET "M2" appears.

In order to suppress the above-described increase of the gate voltage, in conventional techniques, the below-mentioned means has been proposed (for instance, JP-A-2000-59189): That is, while a power supply having a negative voltage is employed, when a power MOSFET is turned OFF, the above-described means biases a gate thereof to become minus. However, since the power supply having the negative voltage is employed, there is such a problem that cost and a size of a drive circuit of an inverter are increased.

On the other hand, another means has been proposed (for example, JP-A-08-14976): That is, when a power MOSFET is turned OFF, the above-described means biases a gate thereof to become minus without employing the power supply having the negative voltage. However, in this conventional means, since a gate voltage applied when the power MOSFET is turned ON is decreased lower than a power supply voltage of a drive circuit, there is such a problem that an ON-resistance of this power MOSFET is increased, so that conduction loss thereof is increased.

SUMMARY OF THE INVENTION

The present invention has been made to solve the above-described problems of the conventional techniques, and therefore, has an object to provide a drive circuit of a voltage driving type semiconductor element, and an inverter apparatus, which are capable of preventing erroneous ignition without increasing conduction loss thereof, while using only a power supply having a positive voltage.

To achieve the above-described object, a drive circuit of a voltage driving type semiconductor element, according to an aspect of the present invention, is featured in that a voltage driving type semiconductor element of a power converter is provided and the drive circuit drives the voltage driving type semiconductor element; and the drive circuit is comprised of: a first switch connected to a positive side of a DC power supply; a second switch connected to the other terminal of the first switch and to a negative side of the DC power supply; a third switch connected to the positive side of the DC power supply; a fourth switch connected to the other terminal of the third switch; a fifth switch connected to the other terminal of the fourth switch and to the negative side of the DC power supply; and a capacitor connected to the other terminal of the first switch and to the other terminal of the fourth switch; in which a gate of the voltage driving type semiconductor element is connected to the other terminal of the third switch; and a source of the voltage driving type semiconductor element is connected to the negative side of the DC power supply.

Also, in order to achieve the above-described object, a drive circuit of a voltage driving type semiconductor element, according to the present invention, is featured by that the first, third, and fifth switches are turned ON at the same timing; and the second and the fourth switches are turned ON at complementary timing with respect to the first, third, and fifth switches.

As previously described, in accordance with the present invention, the gate of the voltage driving type semiconductor element operated under the OFF state can be maintained at the negative potential only by employing the power supply having the positive voltage. As a result, while the cost, the size, and the conduction loss of the drive circuit are not increased, it is possible to avoid the voltage driving type semiconductor element being erroneously ignited.

The present invention can be employed in the drive circuit of the voltage driving type semiconductor element and the inverter apparatus which are employed in the power converter.

DETAILED DESCRIPTION OF THE INVENTION

Figure 1:
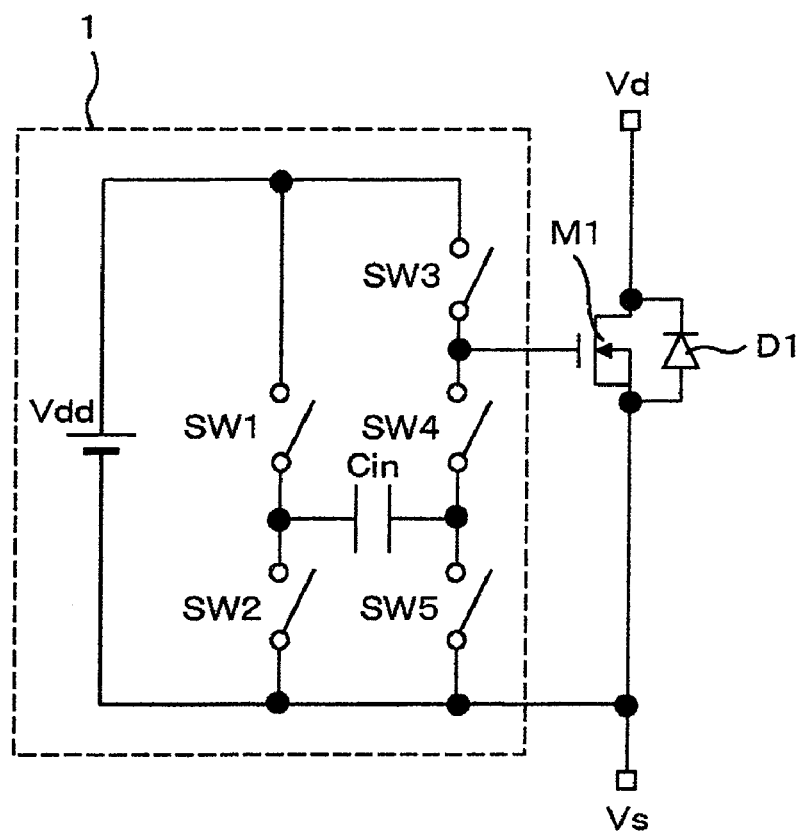
FIG. 1 is a structural diagram for showing a drive circuit of a voltage driving type semiconductor element according to a first embodiment of the present invention.

Referring now to the drawings, a description is made of various embodiments of the present invention.

FIG. 1 is a structural diagram for showing a drive circuit of a voltage driving type semiconductor element according to a first embodiment of the present invention, namely an exemplification in which a power MOSFET "M1" is represented as the above-described voltage driving type semiconductor element. The circuit arrangement of the first embodiment is constituted by a diode "D1" built in the power MOSFET "M1", a drive circuit 1 of the power MOSFET "M1", a DC power supply "Vdd", first to fifth switches "SW1" to "SW5", and a capacitor "Cin." The first switch "SW1" is connected to a positive side of the DC power supply "Vdd"; the second switch "SW2" is connected to both the other terminal of the first switch "SW1" and a negative side of the DC power supply "Vdd"; the third switch "SW3" is connected to the positive side of the DC power supply "Vdd"; the fourth switch "SW4" is connected to both the other terminal of the third switch "SW3" and the fifth switch SW5; and the fifth switch "SW5" is connected to both the other terminal of the fourth switch "SW4" and the negative side of the DC power supply "Vdd." The capacitor "Cin" is connected to both the other terminal of the first switch "SW1" and the other terminal of the fourth switch "SW4"; a gate of the power MOSFET "M1" is connected to the other terminal of the third switch "SW3"; and a source of the power MOSFET "M1" is connected to the negative side of the DC power supply "Vdd."

Figure 2:
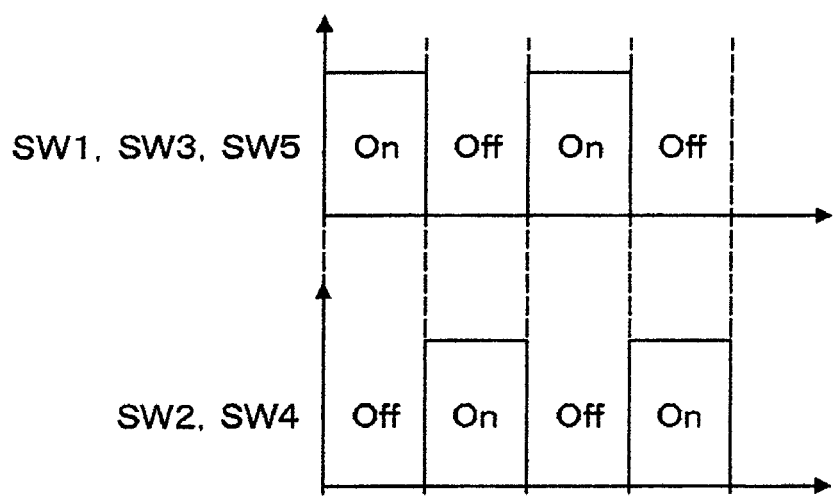
FIG. 2 represents a timing chart of switches employed in the drive circuit of the first embodiment of the present invention.

FIG. 2 is a timing chart for showing ON/OFF timing as to the above-described first to fifth switches "SW1" to "SW5." Namely, this timing chart represents that the first switch "SW1", the third switch "SW3", and the fifth switch "SW5" are turned ON at the same timing, whereas the second switch "SW2" and the fourth switch "SW4" are turned ON in a complementary timing manner with respect to the above-described first, third, and fifth switches "SW1", "SW3", and "SW5."

Figure 3:
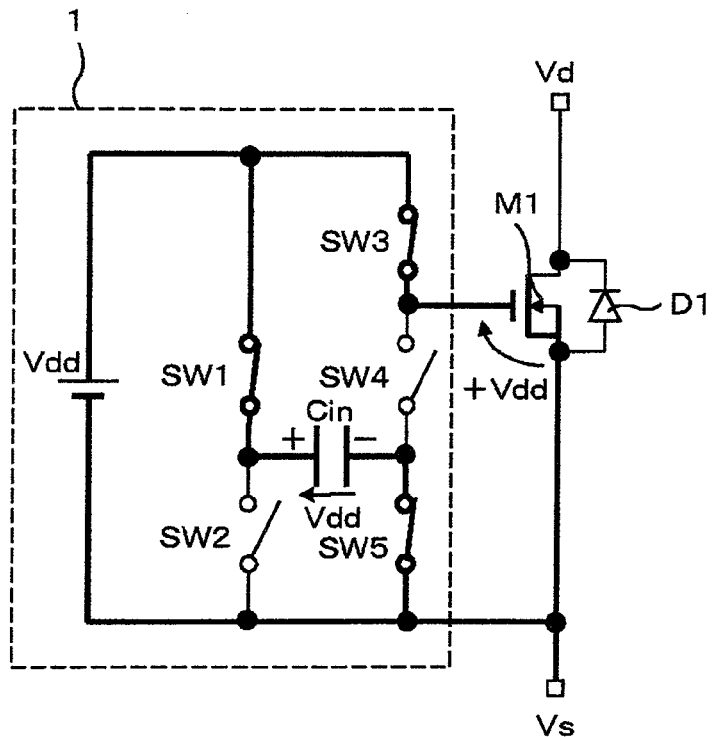
FIG. 3 is a structural diagram when the voltage driving type semiconductor element is turned ON according to the first embodiment of the present invention.
Figure 4:
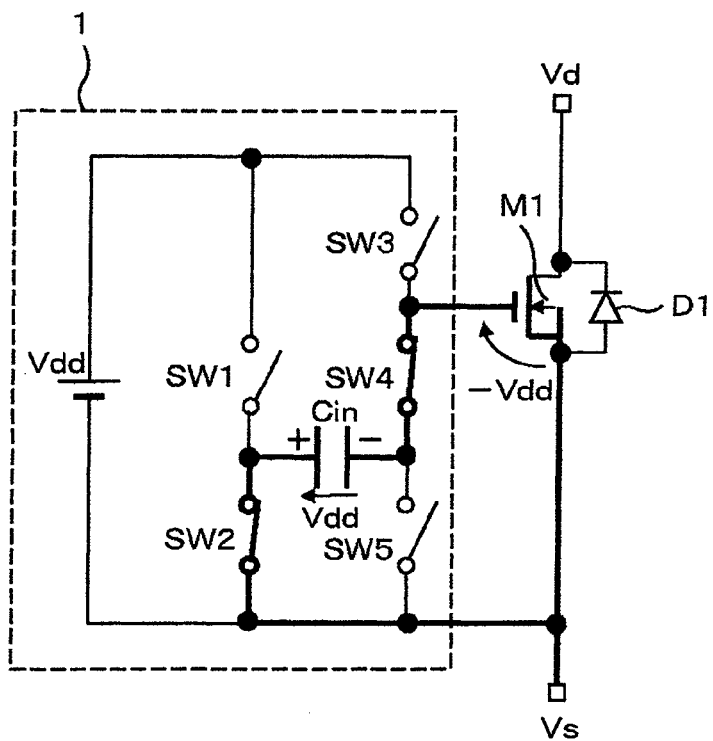
FIG. 4 is a structural diagram when the voltage driving type semiconductor element is turned OFF according to the first embodiment of the present invention.

Next, a description is made of voltages which are applied to the gate of the power MOSFET "M1" when the first to fifth switches "SW1" to "SW5" are turned ON at the timing shown in FIG. 2 with reference to FIG. 3 and FIG. 4. In FIG. 3, at such a timing when the power MOSFET "M1" is turned ON, the first switch "SW1", the third switch "SW3", and the fifth switch "SW5" have been turned ON, whereas the second switch "SW2" and the fourth switch "SW4" have been turned OFF. A potential at the gate of the power MOSFET "M1" is charged up to the voltage of the DC power supply "Vdd" via such a path formed by the DC power supply "Vdd" and the third switch "SW3." On the other hand, a potential at the capacitor "Cin" is charged up to a positive power supply voltage "+Vdd" via such a path formed by the DC power supply "Vdd", the first switch "SW1", and the fifth switch "SW5."

In FIG. 4, at such a timing when the power MOSFET "M1" is turned OFF, the second switch "SW2" and the fourth switch "SW4" have been turned ON, whereas the first switch "SW1", the third switch "SW3", and the fifth switch "SW5" have been turned OFF. A potential at the gate of the power MOSFET "M1" is charged up to a negative power supply voltage "−Vdd" via such a path formed by the fourth switch "SW4", the capacitor "Cin", and the second switch "SW2."

In other words, under such a condition that the power MOSFET "M1" is under ON state, the positive power supply voltage "+Vdd" is applied to the gate thereof, so that the ON resistance of the power MOSFET "M1" is not increased, but also the conduction loss thereof is not increased. On the other hand, under such a condition that the power MOSFET "M1" is turned OFF, the negative power supply voltage "−Vdd" is applied to the gate thereof. As a result, it is possible to suppress that the gate voltage is increased higher than or equal to the threshold value when the power MOSFET "M1" is operated in the switching manner, and also, it is possible to avoid that the upper arm and the lower arm are shortcircuited.

Next, a description is made of a proper capacitance value of the above-described capacitor "Cin." When the power MOSFET "M1" is turned ON, the negative power supply voltage "−Vdd" is applied from the capacitor "Cin", so that the capacitance of the capacitor "Cin" is necessarily required to become sufficiently larger than the gate capacitance of the power MOSFET "M1." For instance, in order that an absolute value of a negative voltage of the gate when the power MOSFET "M1" is turned OFF is higher than or equal to 90% of the power supply voltage "Vdd", the capacitance of the above-described capacitor "Cin" must be made larger than, or equal to the gate capacitance of the power MOSFET "M1."

Figure 5:
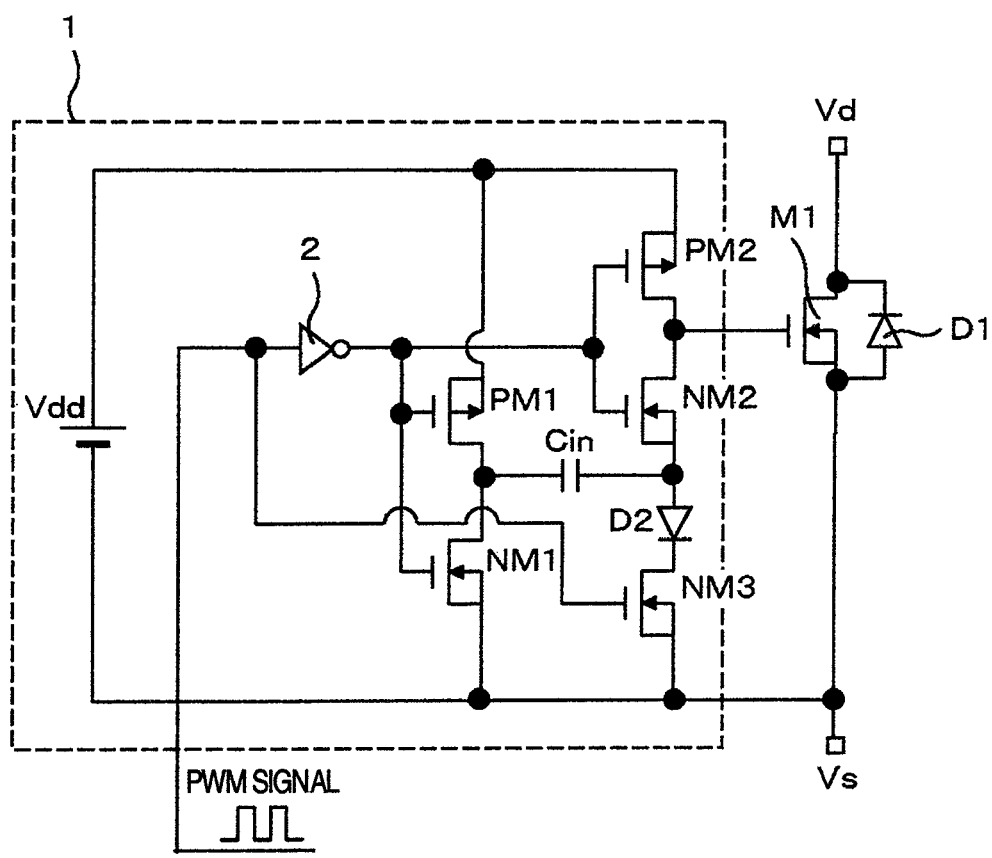
FIG. 5 is a structural diagram for showing a drive circuit of a voltage driving type semiconductor element according to a second embodiment of the present invention.

FIG. 5 is a structural diagram for showing a drive circuit 1 of a voltage driving type semiconductor element according to a second embodiment of the present invention. The drive circuit 1 has been arranged by a DC power supply "Vdd", a logic inverter 2, first and second p-type channel MOSFETs "PM1" and "PM2", first to third n-type channel MOSFETs "NM1" to "NM3", a diode "D2", and a capacitor "Cin." A PWM logic signal has been inputted to an input terminal of the logic inverter 2.

A source terminal of the first p-type channel MOSFET "PM1" is connected to the positive side of the DC power supply "Vdd"; a drain terminal of the first n-type channel MOSFET "NM1" is connected to a drain terminal of the above-described first p-type channel MOSFET "PM1" and a source terminal thereof is connected to the negative side of the DC power supply "Vdd"; a source terminal of the second p-type channel MOSFET "PM2" is connected to the positive side of the DC power supply "Vdd"; a drain terminal of the second n-type channel MOSFET "NM2" is connected to the drain terminal of the above-described second p-type channel MOSFET "PM2"; a source terminal of the above-described second n-type channel MOSFET "NM2" is connected to an anode terminal of the diode "D2"; a drain terminal of the third n-type channel MOSFET "NM3" is connected to a cathode terminal of the diode "D2"; a source terminal of the third n-type channel MOSFET "NM3" is connected to the negative side of the DC power supply "Vdd"; the above-described capacitor "Cin" is connected to both the drain terminal of the first p-type channel MOSFET "PM1" and the source terminal of the second n-type channel MOSFET "NM2"; a gate of the power MOSFET "M1" is connected to the drain terminal of the second p-type channel MOSFET "PM2"; a source terminal of the above-described power MOSFET "M1" is connected to the negative side of the DC power supply "Vdd"; a gate terminal of the third n-type channel MOSFET "NM3" is connected to the input terminal of the logic inverter 2; and also, a gate terminal of the first p-type channel MOSFET "PM1", a gate terminal of the first n-type channel MOSFET "NM1", a gate terminal of the second p-type channel MOSFET "PM2", and a gate terminal of the second n-type channel MOSFET "NM2" are connected to the output terminal of the logic inverter 2.

Figure 6:
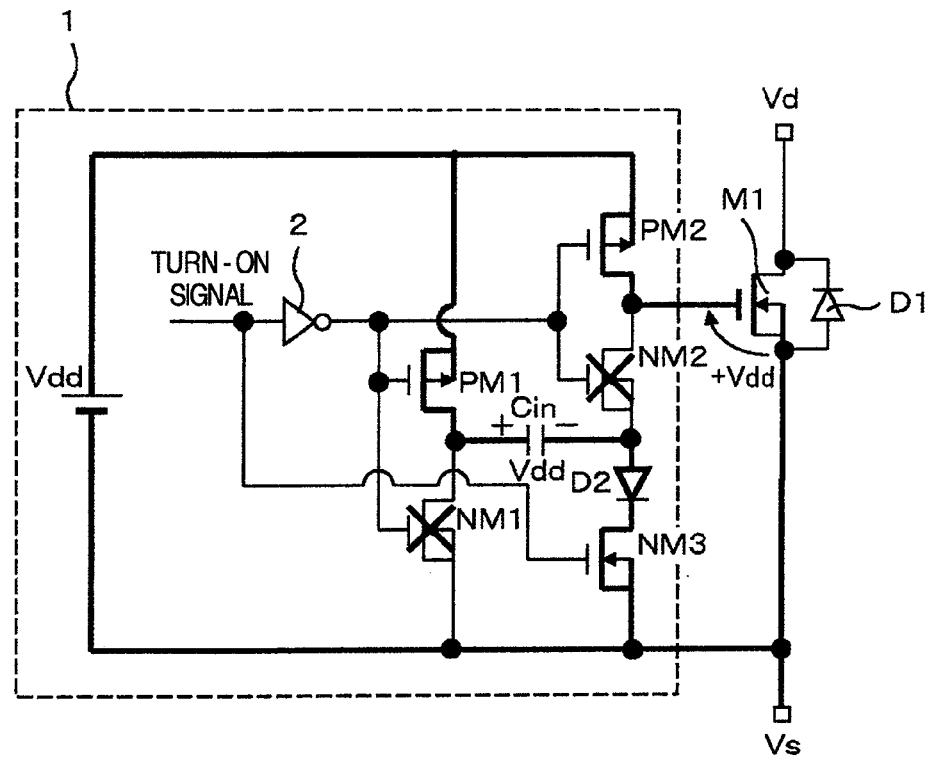
FIG. 6 is a structural diagram when the voltage driving type semiconductor element is turned ON according to the second embodiment of the present invention.

Subsequently, a detailed description is made of operations of the circuit shown in FIG. 5 with reference to FIG. 6 and FIG. 7. FIG. 6 indicates such a case that the power MOSFET "M1" is turned ON. In this case, a turn-ON signal is inputted to the logic inverter 2; the first p-type channel MOSFET "PM1", the second p-type channel MOSFET "PM2", the third n-type channel MOSFET "NM3", and the diode "D2" are turned ON; the first n-type channel MOSFET "NM1" and the second n-type channel MOSFET "NM2" are turned OFF; and thus, both the gate of the above-described power MOSFET "M1" and the capacitor "Cin" are charged to the positive power supply voltage "Vdd."

Figure 7:
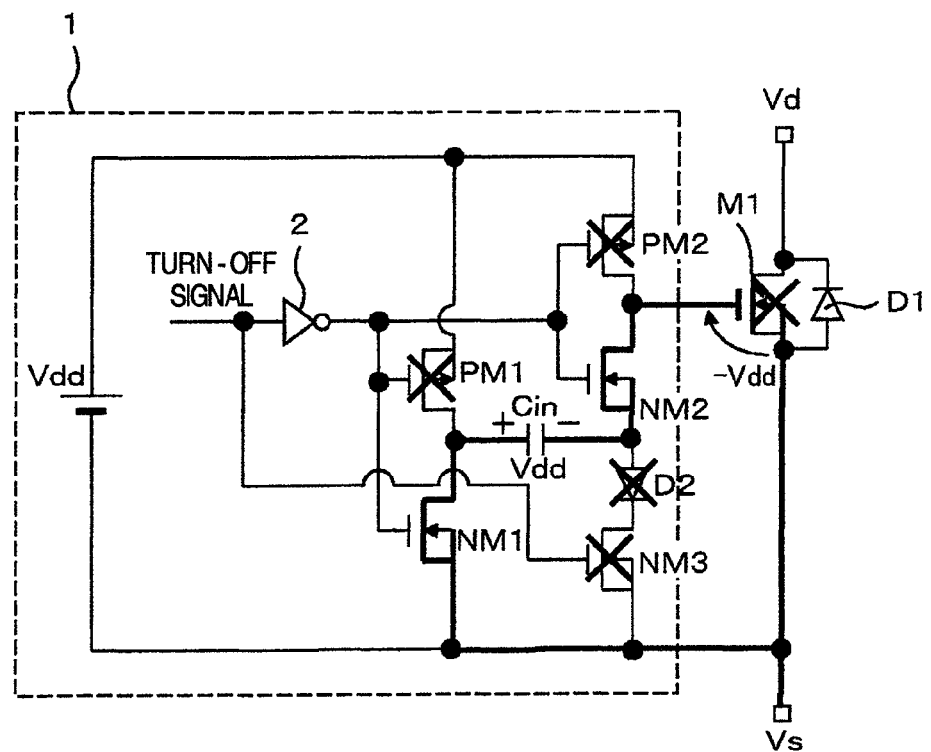
FIG. 7 is a structural diagram when the voltage driving type semiconductor element is turned OFF according to the second embodiment of the present invention.

FIG. 7 indicates such a case that the power MOSFET "M1" is turned OFF. In this case, a turn-OFF signal is inputted to the logic inverter 2; the first n-type channel MOSFET "NM1" and the second n-type channel MOSFET "NM2" are turned ON; the first p-type channel MOSFET "PM1", the second p-type channel MOSFET "PM2", the third n-type channel MOSFET "NM3", and the diode "D2" are turned OFF; and thus, both the gate of the above-described power MOSFET "M1" is biased to the negative power supply voltage "−Vdd."

In FIG. 7, if the above-described diode "D2" is not present, in such a case that the positive voltage is applied to the source terminal of the third n-type channel MOSFET "NM3" with respect to the drain terminal thereof, then a current may flow through a stray diode of an n-type channel MOSFET to the above-described third n-type channel MOSFET "NM3."

Figure 8:
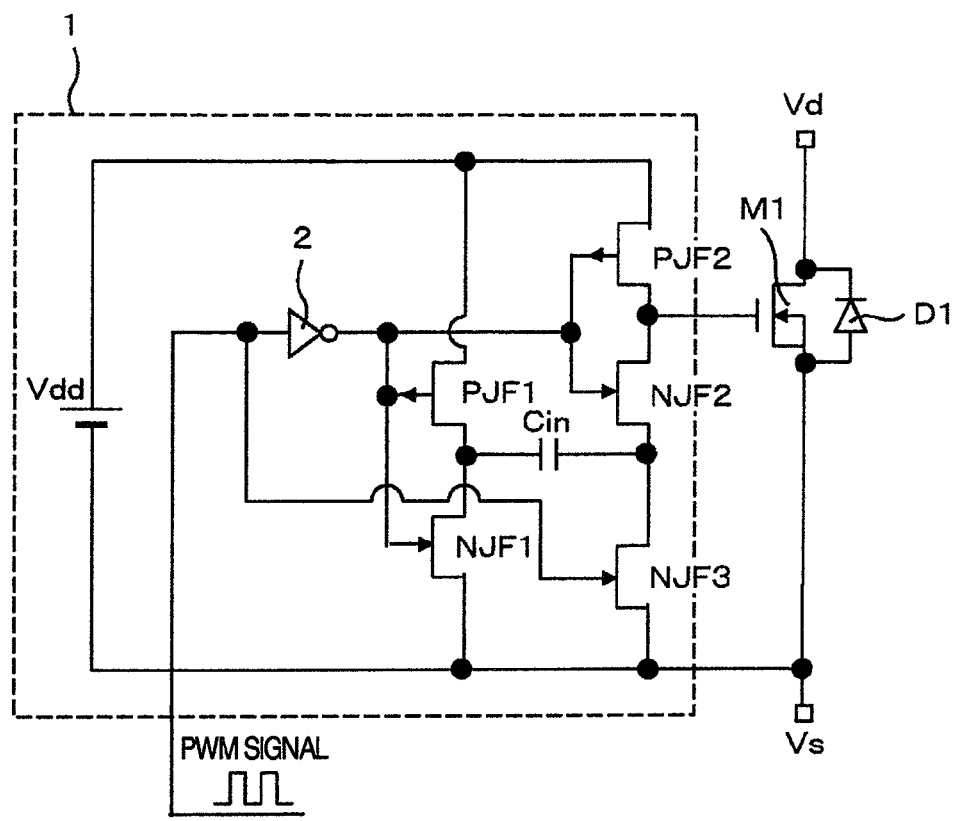
FIG. 8 is a structural diagram when a voltage driving type semiconductor element is turned ON according to a third embodiment of the present invention.

FIG. 8 is a structural diagram for showing a drive circuit 1 of a voltage driving type semiconductor element according to a third embodiment of the present invention. The drive circuit 1 has been arranged by a DC power supply "Vdd", a logic inverter 2, first and second p type JFETs "PJF1" and "PJF2", first to third n type JFETs "NJF1" to "NJF3", and a capacitor "Cin", while a PWM logic signal is inputted to an input terminal of the logic inverter 2. In this case, symbol "JFET" implies a Junction Field-Effect Transistor. Since the above-described JFET has no such a stray diode as formed in a MOSFET, if an element structure of a JFET is properly designed, then an n type JFET can have a blocking characteristic even when a potential at a source of the n type JFET becomes a positive voltage with respect to a potential at a drain thereof. As a result, the above-described diode "D2" which has been necessarily required in the second embodiment is no longer required in this third embodiment.

A source terminal of the first p type JFET "PJF1" is connected to the positive side of the above-described DC power supply "Vdd"; a drain terminal of the first n type JFET "NJF1" is connected to a drain terminal of the above-described first p type JFET "JPF1", and a source terminal thereof is connected to the negative side of the DC power supply "Vdd", a source terminal of the second p type JFET "PJF2" is connected to the positive side of the DC power supply "Vdd"; a drain terminal of the second n type JFET "NJF2" is connected to a drain terminal of the second p type JFET "PJF2"; a source terminal of the second n type JFET "NJF2" is connected to a drain terminal of the third n type JFET "NJF3", a source terminal of the third n type JFET "NJF3" is connected to the negative side of the DC power supply "Vdd"; the capacitor "Cin" is connected to both the drain terminal of the first p type JFET "PJF1" and the source terminal of the second n type JFET "NJF2"; a gate of a power MOSFET "M1" is connected to the drain terminal of the second p type JFET "PJF2"; a source terminal of the power MOSFET "M1" is connected to the negative side of the DC power supply "Vdd"; a gate terminal of the third n type JFET "NJF3" is connected to an input terminal of the logic inverter 2; and also, the gate terminal of the first p type JFET "PJF1", the gate terminal of the first n type JFET "NJF1", the gate terminal of the second p type JFET "PJF2", and the gate terminal of the second n type JFET "NJF2" are connected to an output terminal of the logic inverter 2.

In such a case that the power MOSFET "M1" is turned ON, while a turn-ON signal is inputted to the logic inverter 2, the first p type JFET "PJF1", the second p type JFET "PJF2", and the third n type JFET "NJF3" are turned ON, whereas the first n type JFET "NJF1" and the second n type JFET "NJF2" are turned OFF, so that the gate of the power MOSFET "M1" and the capacitor "Cin" are charged to the positive power supply voltage "Vdd."

In such a case that the power MOSFET "M1" is turned OFF, while a turn-OFF signal is inputted to the logic inverter 2, the first p type JFET "PJF1", the second p type JFET "PJF2", and the third n type JFET "NJF3" are turned OFF, whereas the first n type JFET "NJF1" and the second n type JFET "NJF2" are turned ON, so that the gate of the power MOSFET "M1" is biased to the negative power supply voltage "−Vdd."

Figure 9:
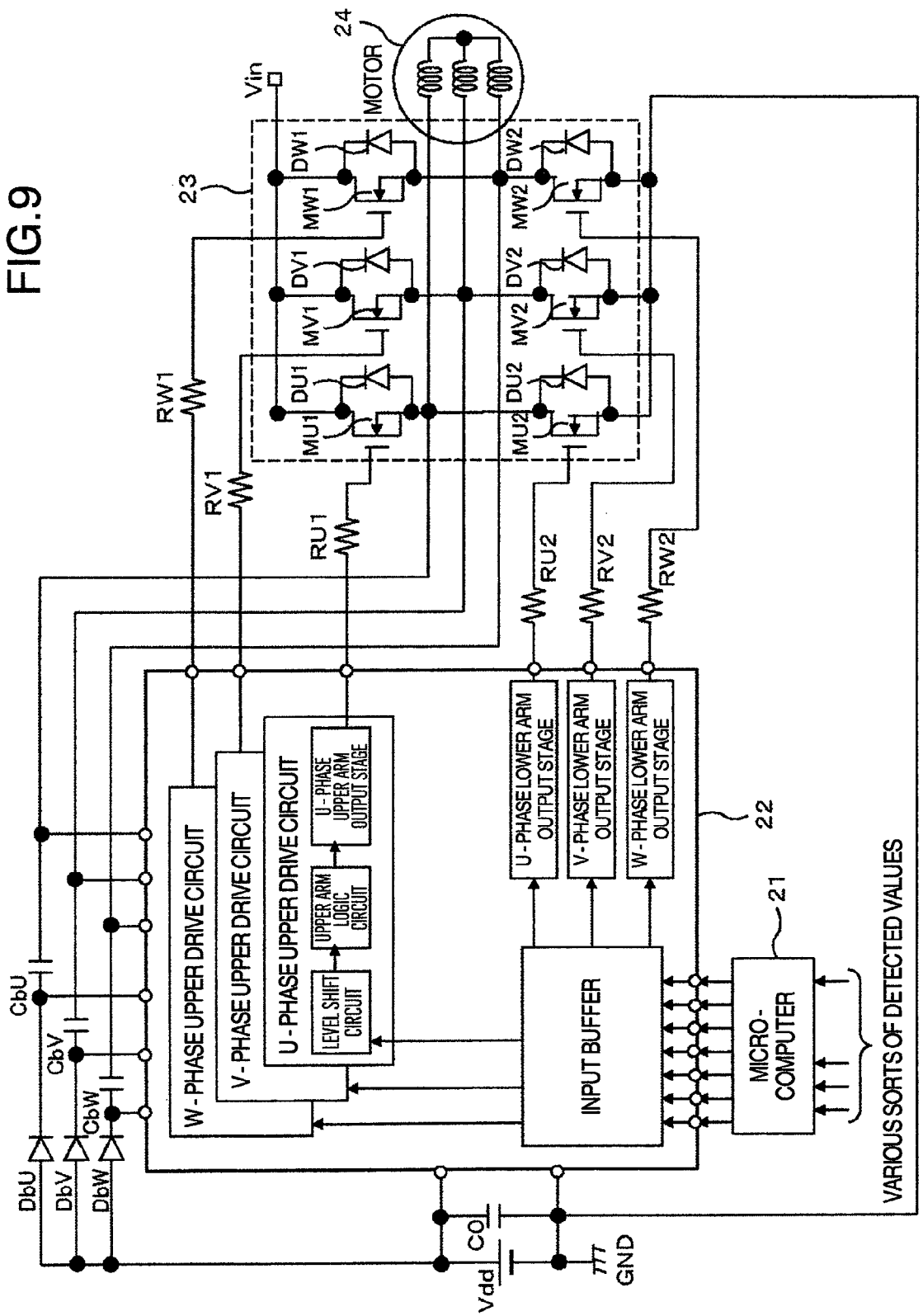
FIG. 9 is a structural diagram of a 3-phase inverter.
Figure 10:
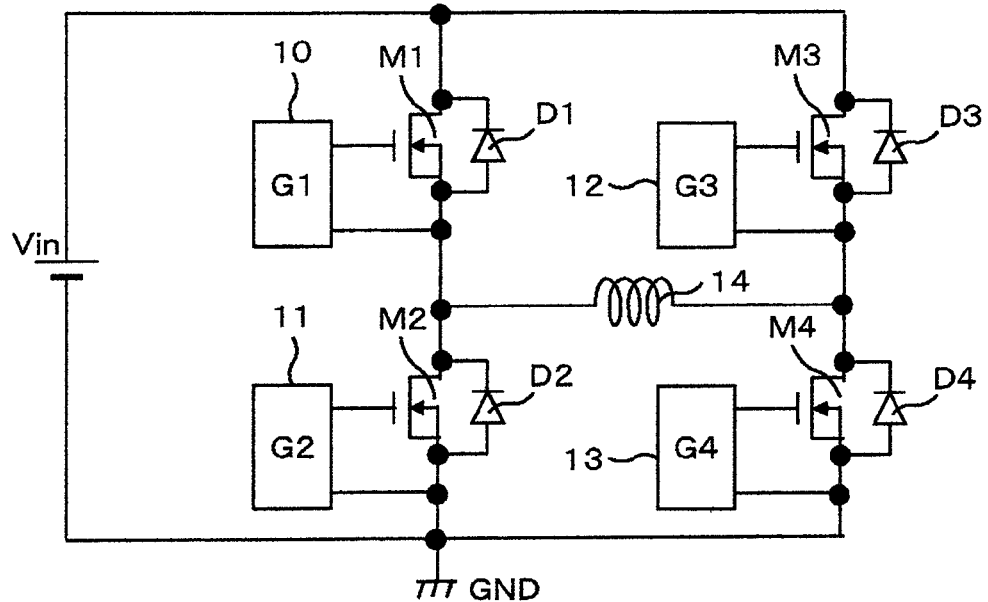
FIG. 10 is a structural diagram of a single-phase inverter.
Figure 11:
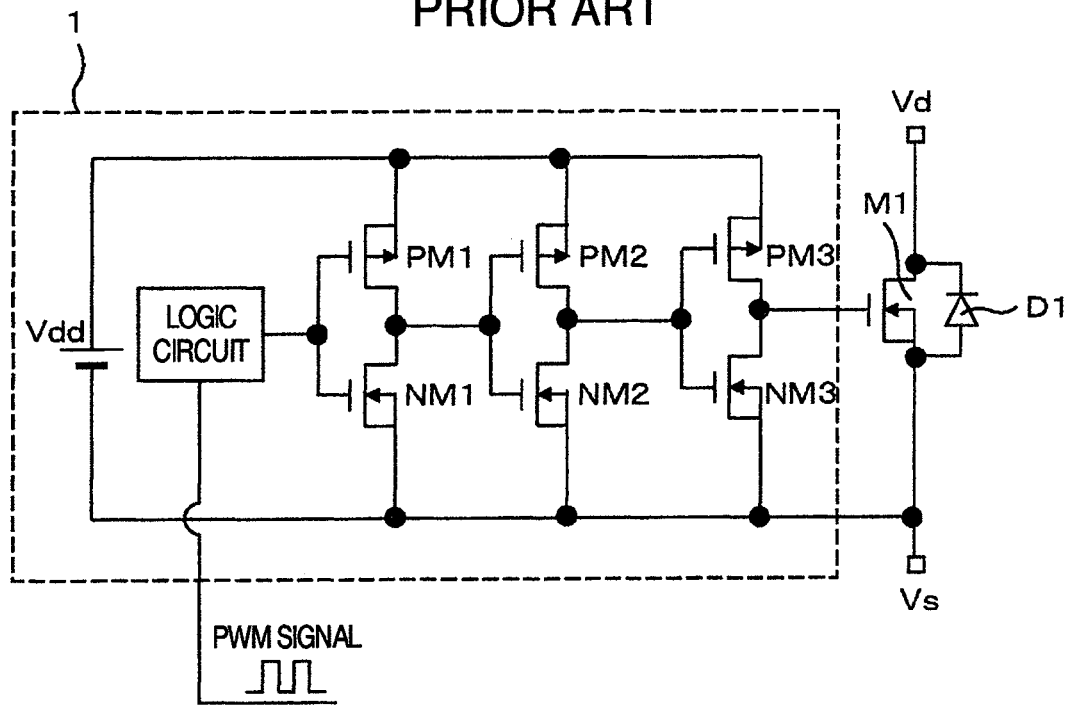
FIG. 11 is the structural diagram for showing the conventional drive circuit.
Figure 12:
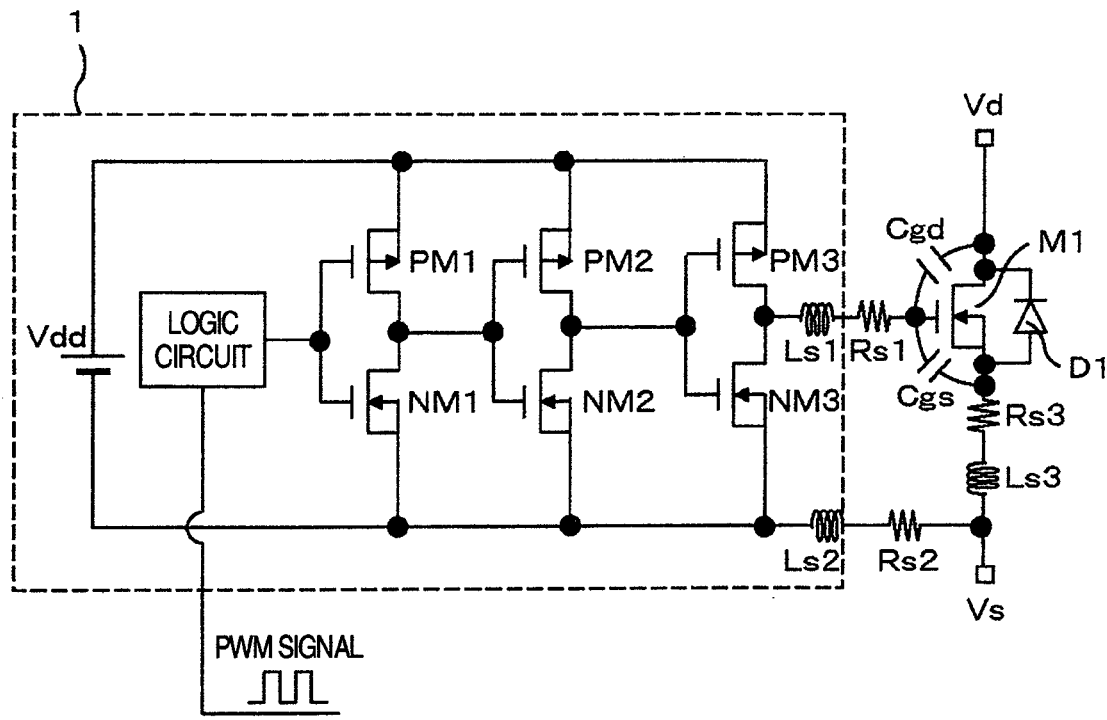
FIG. 12 is the structural diagram of the conventional drive circuit, while considering stray elements.
Figure 13:
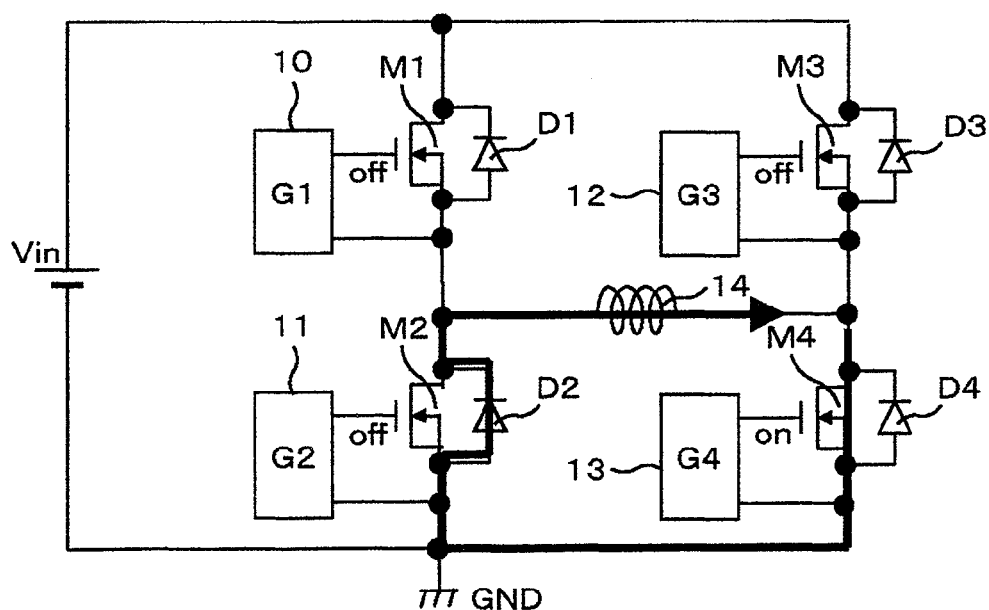
FIG. 13 is the structural diagram for representing the circulating current mode of the conventional single-phase inverter.
Figure 14:
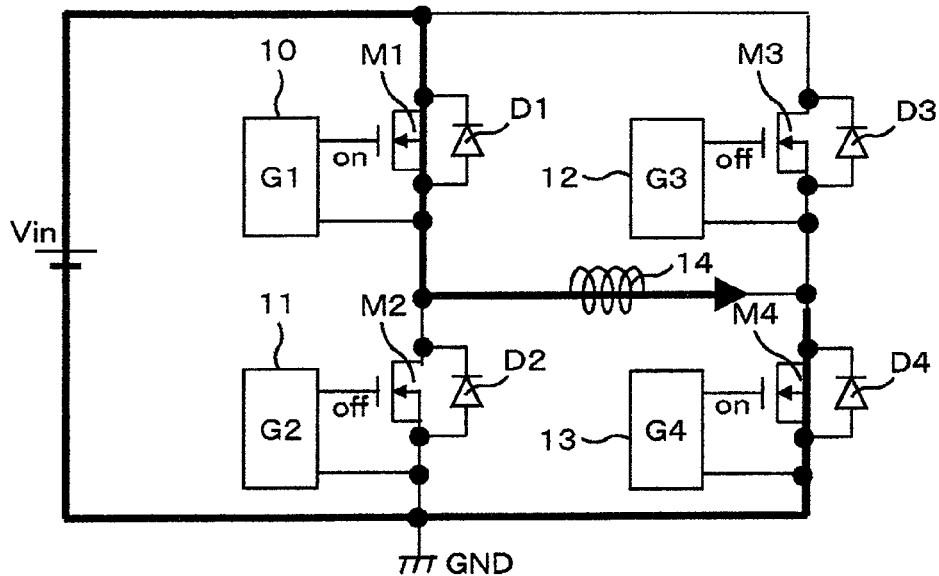
FIG. 14 is the structural diagram for indicating the voltage applied mode of the conventional single-phase inverter.
Figure 15:
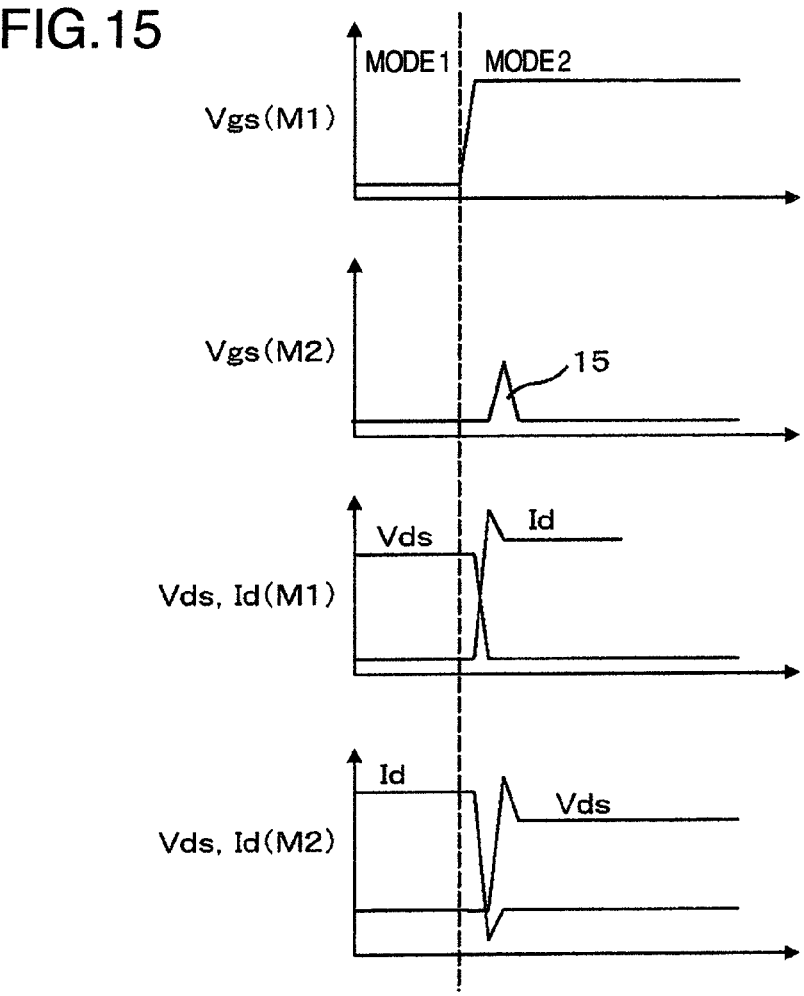
FIG. 15 represents the voltage waveforms and the current waveforms as to the conventional single-phase inverter.

FIG. 9 is a structural diagram of an inverter system of an embodiment in which the present invention has been applied to a drive circuit of a 3-phase inverter. As structural elements of the inverter system, there are provided: a microcomputer 21, a driver IC 22, a switching unit 23, and a 3-phase motor 24. The above-described switching unit 23 is arranged by 3phases, namely, a U phase, a V phase, and a W phase. The respective phases "U", "V", "W" are constituted by power MOSFETs "MU1", "MV1", "MW1" of an upper arm and built-in diodes "DU1", "DV1", "DW1"; and also, power MOSFETs "MU2", "MV2", "MW2" of a lower arm and built-in diodes "DU2", "DV2", "DW2." The microcomputer 21 detects information related to a position, a speed, and the like of the motor 24, and then outputs such a signal for driving the above-described power MOSFETs to the drive IC 22. Since source potentials of the power MOSFETs "MU1", "MV1", "MW1" of the upper arm are under floating conditions, a level shifting power supply and a floating power supply are required in order to drive the power MOSFETs "MU1", "MV1", "MW1" of the upper arm. In FIG. 9, the upper arm is driven by such electron charges which have been charged via bootstrap-purpose diodes "DbU", "DbV", "DbW" into bootstrap capacitors "CbU", "CbV", "CbW." As a means for driving the gates of the power MOSFETs "MU1", "MV1", "MW1" of the upper arm, whose source potentials are under floating conditions, a method for employing a photocoupler may be alternatively applied in addition to the bootstrap circuit shown in FIG. 9.

As previously described, when the drive circuit of the present invention is embodied in either the output stage of the upper arm or the output stage of the lower arm, it is possible to suppress an increase of a gate voltage of such a power MOSFET which is under OFF state when this power MOSFET is operated in a switching mode, and it is also possible to avoid that the upper arm and the lower arm are shortcircuited.

In the above-descried embodiments, the power MOSFETs have been exemplified as the voltage driving type semiconductor elements. Alternatively, other voltage driving type semiconductor elements such as IGBTs may be similarly applied.

The invention claimed is:

1. A drive circuit of a voltage driving type semiconductor element, which drives the voltage driving type semiconductor element, comprising:
   a first switch connected to a positive side of a DC power supply;
   a second switch connected to the other terminal of said first switch and to a negative side of said DC power supply;
   a third switch connected to the positive side of the DC power supply;
   a fourth switch connected to the other terminal of said third switch;
   a fifth switch connected to the other terminal of said fourth switch and to the negative side of the DC power supply; and
   a capacitor connected to the other terminal of said first switch and to the other terminal of said fourth switch; wherein:
   a gate of said voltage driving type semiconductor element is connected to the other terminal of said third switch; and
   a source of said voltage driving type semiconductor element is connected to the negative side of said DC power supply,
   wherein:
   said first, third, and fifth switches are turned ON at the same timing; and
   said second and said fourth switches are turned ON at complementary timing with respect to said first, third, and fifth switches.

2. A drive circuit of a voltage driving type semiconductor element as claimed in claim 1, wherein:
   a power MOSFET (Metal Oxide Semiconductor Field-Effect Transistor) is employed as said voltage driving type semiconductor element.

3. A drive circuit of a voltage driving type semiconductor element as claimed in claim 1, wherein:
   an IGBT (Insulated-Gate Bipolar Transistor) is employed as said voltage driving type semiconductor element.

4. A drive circuit of a voltage driving type semiconductor element as claimed in claim 1, wherein:
   a capacitance of said capacitor is larger than, or equal to a gate capacitance of said voltage driving type semiconductor element.

5. An inverter apparatus comprising: an arm in which a semiconductor power switching element of an upper arm is series-connected to a semiconductor power switching element of a lower arm between main terminals; and a drive circuit of said arm; wherein:
   said inverter apparatus is comprised of one, or a plurality of said arms, and is comprised of a voltage driving type semiconductor element as said semiconductor power switching element; and wherein:

the drive circuit for driving said voltage driving type semiconductor element is comprised of: a first switch connected to a positive side of a DC power supply; a second switch connected to the other terminal of said first switch and to a negative side of said DC power supply; a third switch connected to the positive side of the DC power supply; a fourth switch connected to the other terminal of said third switch; a fifth switch connected to the other terminal of said fourth switch and to the negative side of the DC power supply; and a capacitor connected to the other terminal of said first switch and to the other terminal of said fourth switch; in which a gate of said voltage driving type semiconductor element is connected to the other terminal of said third switch; and a source of said voltage driving type semiconductor element is connected to the negative side of said DC power supply, wherein:

said first, third, and fifth switches are turned ON at the same timing; and said second and said fourth switches are turned ON at complementary timing with respect to said first, third, and fifth switches.

6. An inverter apparatus as claimed in claim 5, wherein:
a power MOSFET (Metal Oxide Semiconductor Field-Effect Transistor) is employed as said voltage driving type semiconductor element.

7. An inverter apparatus as claimed in claim 5, wherein:
an IGBT (Insulated-Gate Bipolar Transistor) is employed as said voltage driving type semiconductor element.

8. An inverter apparatus as claimed in claim 5, wherein:
a capacitance of said capacitor is larger than, or equal to a gate capacitance of said voltage driving type semiconductor element.

* * * * *